July 22, 1969 P. F. GIBBONS ET AL 3,456,988
CONTROL SYSTEM FOR SPRING AND AIR APPLIED BRAKE ACTUATORS
Filed June 1, 1967 2 Sheets-Sheet 1

United States Patent Office 3,456,988
Patented July 22, 1969

3,456,988
CONTROL SYSTEM FOR SPRING AND AIR
APPLIED BRAKE ACTUATORS
Peter Frederick Gibbons, David John Knight, Brian Patrick Neal, and Cyril John Parbery, London, England, assignors to Westinghouse Brake and Signal Company Limited, London, England, a company of Great Britain
Filed June 1, 1967, Ser. No. 642,964
Claims priority, application Great Britain, June 20, 1966, 27,449/66
Int. Cl. B60t *13/74, 13/00;* B61h *13/08*
U.S. Cl. 303—2                           6 Claims

ABSTRACT OF THE DISCLOSURE

A control system for spring and air applied actuators operating on a common brake applying member, such as a slack adjuster, means for preventing the compounding of forces of both actuators on the brake applying member by an interlock arrangement of a double check valve and a pressure reducing valve whereby when the spring applied actuator is applied and pressure above a predetermined value is supplied to the air applied actuator, pressure is delivered through the pressure reducing valve to one inlet of the double check valve and from there to the spring applied actuator to reduce the braking force thereof sufficiently to prevent compounding of forces above a safe level on the brake applying member, the arrangement being such that the pressure delivered by the pressure reducing valve is insufficient to operate the check valve in opposition to normal release pressure delivered to the other inlet of the double check valve so that the spring applied actuator is retained in its released position without inadvertent exhaustion of the release pressure through the normal exhaust means for the air applied actuator.

DETAILED DESCRIPTION

This invention relates to brake systems and more particularly to brake systems employing both spring applied actuators and air applied actuators operable on a common brake applying member, such as a slack adjuster, for applying the brakes.

Air pressure suspended, spring applied brake actuators operable in conjunction with air applied actuators on a common brake applying member, such as a slack adjuster, are well known. In such systems, service applications are provided by the air applied actuator while release pressure is supplied to the spring applied actuator to normally retain this in a brake released position. The release pressure may be under the control of a separate valve for venting release pressure to atmosphere to automatically apply the brakes by the spring applied actuator during an emergency or when parking. Should the operator, while the spring brake is applied, thereafter step on the brake pedal to effect a service application the combined force of the spring and service actuators on the slack adjuster may seriously overload and damage the brake apparatus.

Heretofore the problem of possible compounding of spring and service braking has been avoided in a number of ways, as, for example, by the use of separate housings for the respective actuators with each being connected to the slack adjuster by slotted rods so that when one actuator is applied the other can have no affect on the adjuster. Obviously the separate actuators and mounting means therefor use up valuable space and are expensive. Another arrangement which has been resorted to is a pressure responsive shutoff valve means which positively prevents the release of pressure from the spring applied actuator whenever the pressure supplied to the air applied actuator is above a predetermined level. This arrangement, however, does not prevent compounding when the service brake is applied after the release pressure has been vented from the spring applied brake release chamber.

The broad object of the present invention is to overcome the disadvantages of prior art arrangements by providing a system which, regardless of the sequence of operation of the actuators in a brake applying direction, always insures that at least enough pressure is supplied to the spring applied actuator whenever the air applied actuator is operated so that sufficient release pressure is present to prevent the force of the spring applied actuator compounding with the air applied actuator force over a predetermined value representing a dangerous overload of the brake apparatus.

More particularly, it is an object of the invention to provide fluid pressure responsive interlocking means in and between the supply conduits of the respective spring and fluid pressure applied actuators whereby when the spring applied actuator is applied and pressure above a predetermined value is delivered to the air applied brake actuator, fluid pressure is also delivered to the spring applied actuator to prevent it from applying a force to the brake in excess of a predetermined value.

The foregoing and other objects of the invention are accomplished by the provision in the system of a double check valve whose outlet is connected to the spring applied brake release chamber and whose inlets are connected respectively to a first control valve for the spring applied actuator and to a second control valve for the air applied actuator. Interposed between the second valve for the air applied actuator and its inlet to the double check valve is a pressure reducing valve, the arrangement being such that though the pressure passed by the pressure reducing valve to the spring applied brake when in applied condition is sufficient to reduce the force of the spring applied brake so as to prevent overload, it is not so large as to unseat the double check valve against the opposing force of normal release pressure at the second inlet of the double check valve when it is desired that the spring applied actuator be retained in release position. A one way check valve is provided between the outlet of the pressure reducing valve and the control valve for the air applied actuator to exhaust through the control valve any release pressure delivered by the pressure reducing valve to the spring applied actuator so that the spring applied actuator will return immediately to its full brake applied position upon subsequent release of pressure from the air applied actuator.

Embodiments of the present invention will now be described in greater detail, by way of example only, with reference to the accompanying drawings of which:

Figure 1:
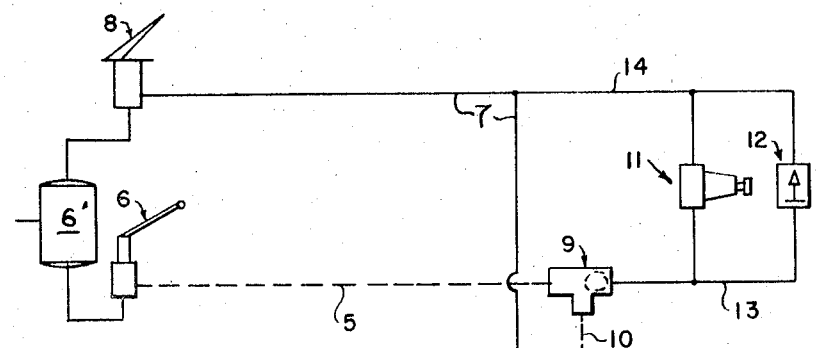
FIGS. 1, 2 and 3 show alternative forms of brake systems.
Figure 1:
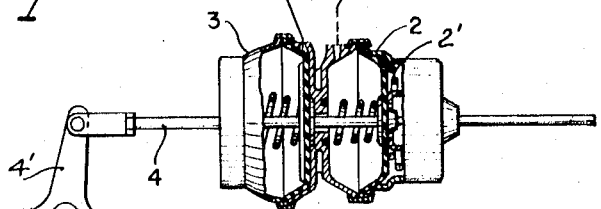

Referring now to FIG. 1, there is shown a composite brake actuator 1 comprising a spring applied brake actuator portion 2 and an air applied brake actuator portion 3, both of which actuator portions are operative on a common brake slack adjuster 4' through a piston rod 4. The composite brake actuator 1 is of conventional construction and requires herein no further description. There is provided a first air line 5 incorporating a control valve 6, over which air pressure can be applied to and withdrawn from the spring applied actuator portion 2 to release and apply respectively the brake (not shown).

Similarly, there is provided a second air line 7 incorporating its own control valve 8, over which air pressure can be applied to and withdrawn from the air applied actuator portion 3 to apply and release respectively the brake.

The first air line 5 is connected to a double check valve 9 to which is also connected a line 10 leading to the spring applied actuator portion 2.

The double check valve 9 constitutes part of an interlocking means arranged between the two air lines 5 and 7. The interlocking means further includes a pressure regulating valve 11 in parallel with which is a one way valve 12 arranged to permit the flow of air only in a direction from the double check valve 9 to the second air line 7 over further lines 13 (connected to the double check valve 9) and 14 (connected to the second air line 7).

The above described brake system operates as follows:

Let it be assumed, firstly, that the brake is fully released. In this condition, the first air line 5 will be fully charged and, therefore, the air pressure pertaining in the first air line 5 will pass through the double check valve 9 to be applied, through the line 10, to the spring applied actuator portion 2 so that the spring 2' incorporated therein is held from exerting a force on the brake rod 4 and is thereby prevented from applying the brake.

Also, the second air line 7 will be at atmospheric pressure so that, thereover, no air pressure will be applied to the air applied brake actuator portion 3 and, once again, no force will be applied to the piston rod 4 to apply the brake.

If now the control valve 8 is operated to make a service application, the pressure in the second air line 7 will be increased to operate the air applied actuator portion 3 and thus, through the brake rod 4, to apply the brake.

If the control valve 8 is operated to an extent to produce in the second air line 7 an air pressure below a predetermined value (so as to result in a brake application below a predetermined value), the air pressure in the second air line 7 will be insufficient to open the pressure regulating valve 11 so that no air pressure is applied to th eright hand side of the double check valve 9.

If, however, the control valve 8 is operated to a greater extent and, in particular, to an extent which produces in the second air line 7 a pressure sufficient to open the pressure regulating valve 11 (and, therefore, a pressure sufficient to produce a braking effect greater than the predetermined value) the difference between the air pressure in the line 7 and the predetermined pressure therein at which the pressure regulating valve 11 opens, will be applied over the line 13 to the right-hand side of the double check valve 9. However, even in this case, this air pressure at the right-hand side will not be allowed to pass through the double check valve 9 for the double check valve 9 will be operated by the higher pressure pertaining in the line 5 at the left-hand side of the check valve 9 overcoming the lower pressure pertaining in the line 13 on the right-hand side of the valve 9, to prevent such passage.

The service application can be released in the usual manner by reoperation of the control valve 8 to exhaust the air from line 7 and any air pressure (arising from a previous brake application in which the air pressure in the line 7 was above the predetermined value at which the pressure regulating valve 11 opened) in the line 13 will be exhausted through the one-way valve 12.

As above described, it has been assumed that the spring applied actuator portion 2 has remained pressurized so that the spring therein has not been effective on the brake rod 4 to tend to apply the brake.

If, however, previous to the operation of the control valve 8, the control valve 6 has been operated to exhaust the air line 5 and, thereby, to allow the spring 2' of the spring applied brake actuator 2 to apply the brake, the operation is as follows:

The operation of the control valve 8 in this circumstance will, again, operate the air applied actuator portion 3 to apply the brake. If the control valve 8 has been operated to an extent to cause the air applied brake actuator portion 3 to apply the brake to an extent greater than the predetermined value, this will have resulted in the air pressure in the second air line 7 being above the predetermined value necessary to open the valve 11.

Resulting from this excess of pressure in the air line 7 above the value at which the pressure regulating valve 11 opens, an air pressure will be applied over the line 13 to the right hand side of the double check valve 9.

As the first air line 5 is now at atmospheric pressure (due to operation of the control valve 6 to cause the spring applied actuator portion 2 to apply the brake), the double check valve 9 will be operated by the then higher pressure pertaining in line 13 at the right hand side of the valve 9, to permit the pressure pertaining in the line 13 to be applied to the spring applied brake actuator portion 2. In such a circumstance, the air pressure pertaining at the right hand side of the double check valve 9 will be transmitted over the line 10 to the spring applied brake actuator portion 2 so that the force exerted by the spring of the spring applied brake actuator 2 will be relieved to some extent by this air pressure transmitted to that actuator portion 2.

It will be seen from the above, that the provision of the interlocking means constituted by the double check valve 9, the pressure regulating valve 11, and the one way valve 12, prevents the operation of the spring applied brake actuator portion 2 fully to apply the brake upon the application of the brake by means of the air applied actuator portion 3.

Operation of the spring applied actuator portion 2 is equally inhibited fully to apply the brake if the spring aplied brake actuator portion 2 is operated after the operation of the air applied brake actuator portion 3 if this latter portion has been operated to an extent to apply the brake to an extent greater than the predetermined value.

In this case, the operation will be as follows:

Operation of the air applied brake actuator portion 3 to produce a brake application greater than the predetermined extent means that the air line 7 has been pressurized to an extent sufficient (as above described) to produce in the line 13 a certain air pressure. However, in contradistinction to the operation as described immediately above, this pressure in the line 13 which, of course, is applied to the right hand side of the double check valve 9 will not operate the valve 9 because the pressure in the first air line 5 (still being at its maximum as the spring applied brake actuator portion 2 has not yet been operated) will apply to the left hand side of the double check valve 9 a higher pressure so that the valve 9 will remain in a condition in which the line 5 is connected to the line 10.

However, if the control valve 6 is operated to an extent to attempt to allow the spring applied brake actuator portion 2 fully to apply the brake (not shown) in the consequent reduction of the air pressure in the first air line 5, a stage will be reached at which the force exerted by the air pressure to the right (as viewed in the drawing) on the left hand side of the double check valve 9 will be below the air pressure on the right hand side of the valve 9. At this point, the double check valve 9 will be operated as above described to allow the air pressure in the line 13 to pass through the double check valve 9 and the line 10, into the spring applied brake actuator portion 2 to prevent the spring of this portion 2 from causing the brakes to be fully applied thereby.

Figure 2:
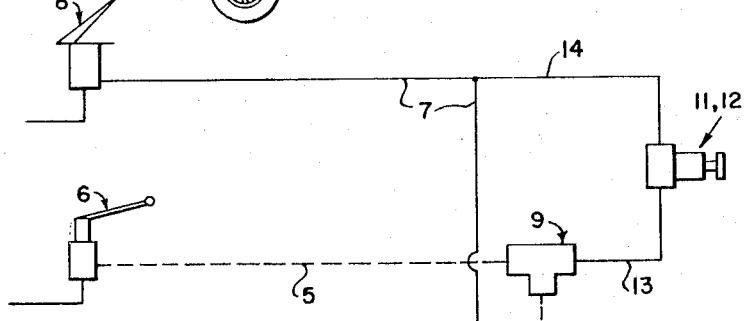
Figure 2:
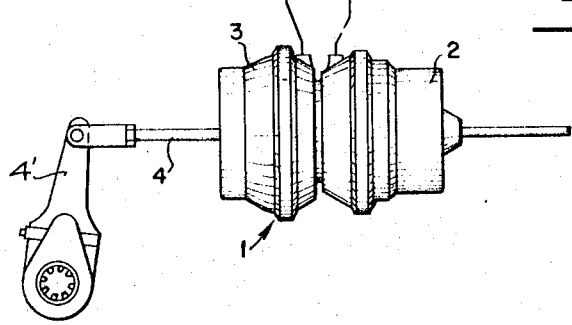

Turning now to FIG. 2, in which like references indicate like parts, the pressure regulating valve 11 and the one way valve 12 may be incorporated, as shown, into a common valve unit 11/12. The operation of the system shown in FIG. 2 is identical to that above described with reference to the system shown in FIG. 1.

Figure 3:
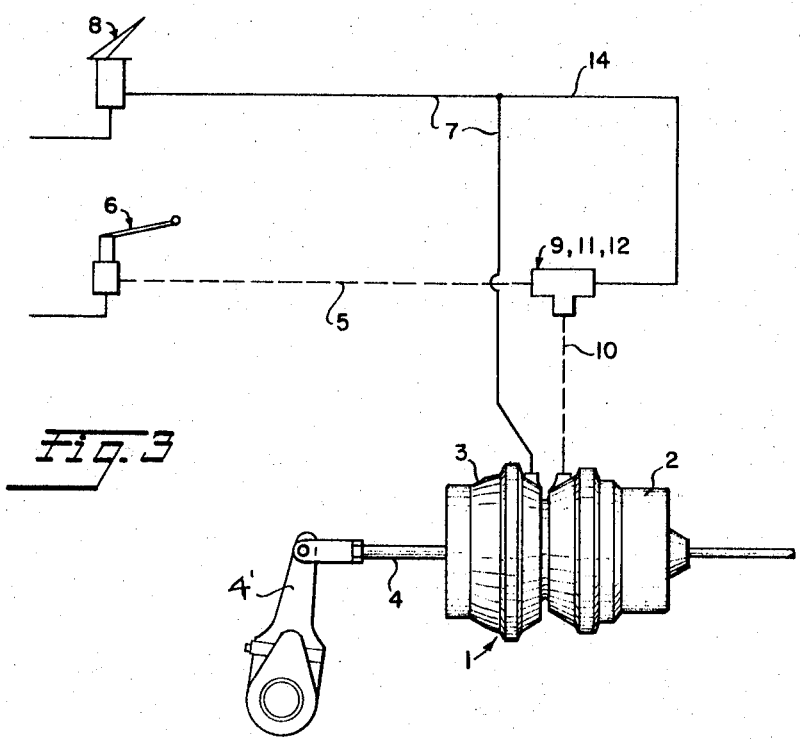

As shown in FIGS. 3 and 4, where, again, like references indicate like parts, the double check valve and the pressure regulating valve may be incorporated into a single composite valve 9/11 (the one way valve 12 not then being necessary) but, again, the operation of the system is generally the same as that above described with reference to the system of FIG. 1.

Figure 4:
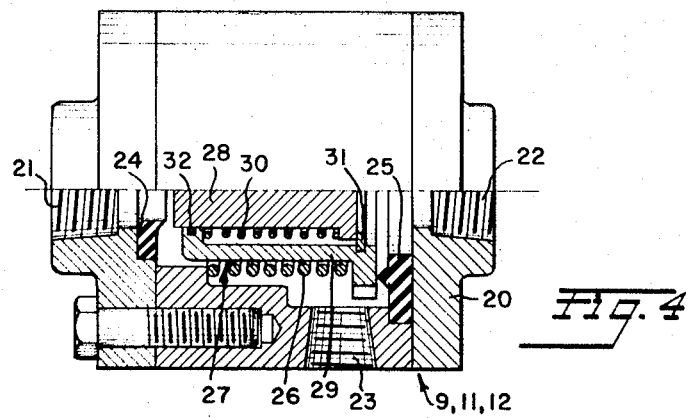
FIG. 4 shows a half cross sectional view of the composite valve incorporated in the system of FIG. 3.

The construction of the composite valve 9/11/12 is shown in FIG. 4 and, as can be seen, the valve 9/11/12 comprises a valve body 20 having therein a first port 21 connected to the first air line 5, a second port 22 connected to the line 13, and a third port 23 connected to the line 10. Arranged between the first port 21 and the third port 23, is a first valve seat 24 and arranged between the second port 22 and the third port 23 is a second valve seat 25.

Normally held into engagement with the valve seat 25 by a spring 26, is a valve closure member 27 which comprises a first portion 28 engageable (upon movement to the left, as viewed in the drawing, of the valve closure member 27) with the first valve seat 24, and a second valve closure member portion 29 normally engaged (as shown) with the valve seat 25. The two portions 28 and 29 are normally held in a position relative one to the other by a second spring 30 which urges the first portion 28 to the right (as viewed in the drawing) out of engagement with the valve seat 24 and into engagement with a circlip 31 carried by the second portion 29. The spring 30 exerts a force tending to held the two portions in their relative normal position which is of less value than the force exerted by the spring 26 tending to hold the valve closure member 27 in engagement with the valve seat 25. Between the two portions 28 and 29 is a seal 32 by which passage of air between the two portions is prevented.

Breaking down the composite valve 9/11/12 into the elements providing the functions of the separate valves, 9, 11 and 12 of the FIG. 1 system, it will be seen that the valve closure member 27 and the two seats 24 and 25 will perform the function of the double check valve 9 and the spring 26 operative on the valve closure member 27 to urge it into engagement with the valve seat 25 will provide the function of the limiting valve 11 (for the spring 26 will determine at what value of air pressure in line 14 the double check valve function operates). In the light of the foregoing, further description of the operation of the FIG. 3 system is unnecessary.

It will be apparent to those skilled in the art that the invention is susceptible of a variety of modifications.

What is claimed is:

1. In an air brake system, including a source of fluid pressure, an air applied actuator and a spring applied actuator operable on a common member to apply a brake, a first control valve interconnecting said source of pressure and both of said actuators for controlling the simultaneous delivery and release of pressure to and from said actuators whereby when one is urged in a brake applying direction the other is simultaneously urged in a brake releasing direction and vice versa, a second control valve between said source of pressure and said spring applied actuator and operable to connect said spring applied actuator directly to the full pressure of said source to release the brake or to atmosphere to apply the brake, the invention which comprises fluid responsive valve means for controlling the delivery from said respective control valves to said spring applied actuator, said valve means being exposed to opposing forces exerted thereon by the respective pressures of the deliveries of said control valves and being freely movable at all times in opposite directions to connect said first control valve to said spring applied actuator after said second control valve is operated to connect the spring applied actuator to atmosphere and to connect said second control valve to said spring applied actuator after said first control valve is operated to release pressure from said actuators, and means for limiting the effective force exerted on said fluid responsive valve means by the delivery pressure of said first control valve to a value which is always less than the effective force exerted by the delivery pressure of said second control valve when the latter is positioned to connect said spring applied actuator directly to said source of pressure whereby said first control valve is disconnected from said spring applied actuator whenever the latter is connected by the second control valve directly to the source of pressure.

2. The system of claim 1 wherein said fluid responsive valve means comprises a double check valve having opposed inlets connected to the first and second control valves and an outlet connected to the spring applied actuator.

3. The system of claim 2 wherein the means for limiting the effective force exerted by the delivery pressure of said first control valve comprises a pressure reducing valve between the first control valve and said double check valve.

4. The system of claim 3 including a one way check valve arranged to permit the flow of fluid past said pressure reducing valve towards said first control valve but not in the reverse direction.

5. The system of claim 1 wherein the means for limiting the effective force exerted by the delivery pressure of said first control valve comprises a pressure reducing valve between the first control valve and the spring applied actuator.

6. In an air brake system, including a source of fluid pressure, an air applied actuator and a spring applied actuator operable on a common member to apply a brake, a first control valve interconnecting said source of pressure and both of said actuators for controlling the simultaneous delivery and release of pressure to and from said actuators whereby when one is urged in a brake applying direction the other is simultaneously urged in a brake releasing direction and vice versa, a second control valve between said source of pressure and said spring applied actuator and operable to control the delivery and release of pressure to and from said spring applied actuator, the invention which comprises interlocking means for preventing both of said actuators from being operated simultaneously to apply a braking force to said common member above a predetermined value comprising double check valve means freely movable at all times in opposite directions and having an outlet connected to said spring applied actuator and inlets connected to the delivery side of the respective control valves so that when either control valve is opened to the pressure source while the other valve is in pressure released position, fluid pressure is delivered through said double check valve to said spring applied actuator to urge it in a brake releasing direction, and means for positively disconnecting said first control valve from said double check valve means whenever said second control valve is operated to connect said spring applied actuator directly to the source of pressure, said last named means comprising a pressure regulating valve between said first control valve and said double check valve means to limit the pressure delivered from said first control valve to said double check valve means to a value which is always proportionately less than the pressure of said source delivered directly to said double check valve means by said second control valve whereby the double check valve means is operated to disconnect said first control valve from said spring applied actuator while connecting the latter directly to said source.

References Cited
UNITED STATES PATENTS 3,116,095  12/1963  Leighton _____ 303—9

FERGUS S. MIDDLETON, Primary Examiner

JOHN J. McLAUGHLIN, Jr., Assistant Examiner

U.S. Cl. X.R.

303—6, 9, 13, 71